(12) United States Patent
Vandonkelaar

(10) Patent No.: US 10,071,306 B2
(45) Date of Patent: Sep. 11, 2018

(54) SYSTEM AND METHOD FOR DETERMINING ORIENTATION USING TRACKING CAMERAS AND INERTIAL MEASUREMENTS

(71) Applicant: Zero Latency PTY LTD, North Melbourne (AU)

(72) Inventor: Scott Vandonkelaar, Alphington (AU)

(73) Assignee: ZERO LATENCY PTY LTD, North Melbourne (AU)

( * ) Notice: Subject to any disclaimer, the term of this patent is extended or adjusted under 35 U.S.C. 154(b) by 140 days.

(21) Appl. No.: 15/081,669

(22) Filed: Mar. 25, 2016

(65) Prior Publication Data
US 2017/0274277 A1    Sep. 28, 2017

(51) Int. Cl.
*A63F 13/06* (2006.01)
*A63F 13/02* (2006.01)
(Continued)

(52) U.S. Cl.
CPC .......... *A63F 13/213* (2014.09); *A63F 13/211* (2014.09); *A63F 13/32* (2014.09); *A63F 13/33* (2014.09); *G06T 19/003* (2013.01); *G06T 19/006* (2013.01); *H04L 67/38* (2013.01); *H04N 5/2224* (2013.01); *A63F 2300/105* (2013.01); *A63F 2300/1087* (2013.01); *A63F 2300/8082* (2013.01); *G06T 2200/04* (2013.01); *H04L 67/10* (2013.01)

(58) Field of Classification Search
USPC ........................................................ 463/36
See application file for complete search history.

(56) References Cited

U.S. PATENT DOCUMENTS 5,490,239 A    2/1996 Myers
5,509,810 A    4/1996 Schertz et al.
(Continued)

FOREIGN PATENT DOCUMENTS

CN    101859439 A    10/2010
EP    1368788 B1    12/2010
(Continued)

OTHER PUBLICATIONS

International Search Report and Written Opinion for PCT/US2016/000374 dated Nov. 15, 2016, 10 pages.
(Continued)

*Primary Examiner* — Pierre E Elisca
(74) *Attorney, Agent, or Firm* — Jennifer Hayes; Nixon Peabody LLP

(57) ABSTRACT

A virtual reality tracking system accurately determines one or more controller orientations using data from tracking cameras and/or an inertial measurement unit (IMU) embedded in each controller. Each controller has two or more distinctive light-emitting tracking markers. The tracking system determines the locations of the tracking markers based on the location of tracking markers in tracking camera's images. The tracking system determines the controller orientation using the locations of the tracking markers and orientation data from the IMU. When the camera views of the markers are obstructed the tracking system relies solely on the less-accurate orientation data from the IMU.

18 Claims, 5 Drawing Sheets

(51) Int. Cl.

| | | |
|---|---|---|
| A63F 13/213 | (2014.01) | |
| A63F 13/211 | (2014.01) | |
| A63F 13/32 | (2014.01) | |
| A63F 13/33 | (2014.01) | |
| G06T 19/00 | (2011.01) | |
| H04L 29/06 | (2006.01) | |
| H04N 5/222 | (2006.01) | |
| H04L 29/08 | (2006.01) | |

(56) References Cited

U.S. PATENT DOCUMENTS

| | | |
|---|---|---|
| 5,717,414 A | 2/1998 | Bergsneider et al. |
| 5,751,289 A | 5/1998 | Myers |
| 5,997,439 A | 12/1999 | Oshuga et al. |
| 6,801,637 B2 | 10/2004 | Voronka et al. |
| 6,950,123 B2 | 9/2005 | Martins |
| 6,972,787 B1 | 12/2005 | Allen et al. |
| 7,046,214 B2 | 5/2006 | Ebersole et al. |
| 7,071,898 B2 | 7/2006 | Hobgood et al. |
| 7,225,548 B2 | 6/2007 | Sieracki et al. |
| 7,262,747 B2 | 8/2007 | Ebersole et al. |
| 7,479,967 B2 | 1/2009 | Bachelder et al. |
| 7,639,233 B2 | 12/2009 | Marks |
| 7,808,524 B2 | 10/2010 | Park et al. |
| 7,918,808 B2 | 4/2011 | Simmons |
| 8,115,814 B2 | 2/2012 | Iwase et al. |
| 8,131,015 B2 | 3/2012 | Hildreth |
| 8,537,113 B2 | 9/2013 | Weising et al. |
| 8,655,020 B2 | 2/2014 | Saptharishi et al. |
| 8,698,875 B2 | 4/2014 | Anguelov et al. |
| 8,705,799 B2 | 4/2014 | White et al. |
| 8,818,420 B2 | 8/2014 | Schatzberg et al. |
| 8,971,574 B2 | 3/2015 | Ye et al. |
| 8,988,343 B2 | 3/2015 | Fei et al. |
| 8,988,508 B2 | 3/2015 | Yahav et al. |
| 9,068,843 B1 | 6/2015 | Sohn et al. |
| 9,147,260 B2 | 9/2015 | Hampapur et al. |
| 9,215,262 B2 | 12/2015 | Oyman |
| 9,221,506 B1 | 12/2015 | Georgeson et al. |
| 2003/0120183 A1 | 6/2003 | Simmons |
| 2004/0063481 A1 | 4/2004 | Wang |
| 2004/0104935 A1 | 6/2004 | Williamson et al. |
| 2005/0168486 A1 | 8/2005 | Sato |
| 2006/0055706 A1 | 3/2006 | Perlman |
| 2006/0247070 A1 | 11/2006 | Funk et al. |
| 2007/0132785 A1 | 6/2007 | Ebersole et al. |
| 2007/0242886 A1 | 10/2007 | St. John |
| 2009/0040308 A1 | 2/2009 | Temovskiy |
| 2009/0209343 A1 | 8/2009 | Foxlin et al. |
| 2010/0075284 A1 | 3/2010 | Kozhevnikov et al. |
| 2010/0166260 A1 | 7/2010 | Huang et al. |
| 2010/0188401 A1 | 7/2010 | Gordon et al. |
| 2010/0210377 A1 | 8/2010 | Lock |
| 2012/0086728 A1 | 4/2012 | McArdle et al. |
| 2012/0142415 A1 | 6/2012 | Lindsay |
| 2013/0063432 A1 | 3/2013 | Kaps et al. |
| 2013/0064427 A1 | 3/2013 | Picard et al. |
| 2013/0076616 A1 | 3/2013 | Csaszar et al. |
| 2014/0272837 A1 | 9/2014 | Becker et al. |
| 2015/0088863 A1 | 3/2015 | Horiba |
| 2015/0116316 A1 | 4/2015 | Fitzgerald et al. |
| 2015/0149104 A1 | 5/2015 | Baker et al. |
| 2015/0193949 A1 | 7/2015 | Katz et al. |
| 2015/0193979 A1 | 7/2015 | Grek |
| 2015/0193983 A1 | 7/2015 | Katz et al. |
| 2015/0208058 A1 | 7/2015 | Denizot et al. |
| 2015/0221135 A1* | 8/2015 | Hill ...................... H04W 4/026 345/633 |
| 2015/0260474 A1 | 9/2015 | Rublowsky et al. |
| 2015/0286275 A1 | 10/2015 | Huang et al. |
| 2015/0302648 A1 | 10/2015 | Zhang |
| 2016/0026253 A1 | 1/2016 | Bradski et al. |
| 2016/0027220 A1 | 1/2016 | Jimenez |
| 2016/0041391 A1 | 2/2016 | Van Curen et al. |
| 2016/0049085 A1 | 2/2016 | Beeson |
| 2016/0054837 A1 | 2/2016 | Stafford |
| 2016/0063731 A1 | 3/2016 | Yamamoto et al. |
| 2016/0124502 A1 | 5/2016 | Sawyer et al. |
| 2016/0140930 A1* | 5/2016 | Pusch ...................... G06F 3/011 345/633 |
| 2016/0191887 A1* | 6/2016 | Casas ...................... G06F 3/011 348/47 |
| 2016/0257000 A1 | 9/2016 | Guerin et al. |
| 2017/0039881 A1 | 2/2017 | Belch et al. |
| 2017/0151484 A1* | 6/2017 | Reilly ................ A63B 71/0622 |
| 2017/0178272 A1* | 6/2017 | Lashkari .................. G06T 1/20 |
| 2017/0274271 A1 | 9/2017 | Vandonkelaar |
| 2017/0274275 A1 | 9/2017 | Vandonkelaar |
| 2017/0277940 A1 | 9/2017 | Vandonkelaar |
| 2017/0319956 A1 | 11/2017 | Vandonkelaar |
| 2018/0043247 A1 | 2/2018 | Vandonkelaar |

FOREIGN PATENT DOCUMENTS

| | | |
|---|---|---|
| WO | 2006103662 A2 | 10/2006 |
| WO | 2015048890 A1 | 4/2015 |
| WO | 2015123771 A1 | 8/2015 |
| WO | 2015123774 A1 | 8/2015 |
| WO | 2018/002698 A1 | 1/2018 |
| WO | 2018/029515 A1 | 2/2018 |
| WO | 2018/037269 A1 | 3/2018 |

OTHER PUBLICATIONS

Arar et al., Estimating Fusion Weights of a Multi-Camera Eye Tracking System by Leveraging User Calibration Data, Proceedings of the Ninth Biennial ACM Symposium on Eye Tracking Research and Applications, 2016, pp. 225-228.

Ehrl et al., A Reliability Measure for Merging Data from Multiple Cameras in Optical Motion Correction, Proc. ISMRM Scientific Workshop—Motion Correction in MRI, 2014, 1 page.

Guerra-Filhol, Optical Motion Capture: Theory and Implementation, Journal of Theoretical and Applied Informatics (RITA), 2005, vol. 12(2), pp. 1-29.

Mannberg et al., High Precision Real-Time 3D Tracking Using Cameras, Infotech at Aerospace, American Institute of Aeronautics and Astronautics, 2011, pp. 1-11.

Vasylevska et al., Influence of Vertical Navigation Metaphors and Presence, Proceedings of the International Society for Presence Research, 2014, pp. 205-212.

International Search Report and Written Opinion for PCT/IB2016/057844 dated Feb. 22, 2017, 15 pages.

International Search Report and Written Opinion for PCT/IB2016/057845 dated Mar. 3, 2017, 10 pages.

International Search Report and Written Opinion for PCT/IB2017/054513 dated Oct. 13, 2017, 12 pages.

Li, Y., Development of Immersive and Interactive Virtual Reality Environment for Two-Player Table Tennis, Diss. University of Central Lancashire, 2012, pp. 96-99.

International Search Report and Written Opinion for PCT/IB2016/000374 dated Nov. 15, 2016, 10 pages.

International Search Report and Written Opinion for PCT/IB2016/000381 dated Dec. 23, 2016, 15 pages.

* cited by examiner

SYSTEM AND METHOD FOR DETERMINING ORIENTATION USING TRACKING CAMERAS AND INERTIAL MEASUREMENTS

BACKGROUND

Field

This invention relates to the field of virtual reality and in particular to virtual reality systems which detect object locations and orientations.

Description of Related Art

Virtual reality (VR) systems replicate an environment that simulates a physical presence in places in the real world or in an imagined world, allowing the user to interact with that world. Virtual realities artificially create sensory experiences, which can include sight, touch, hearing, and smell. Virtual reality systems have many applications including gaming, training and education.

In one type of virtual reality gaming system one or more players physically move around a game arena. Each player wears a virtual reality headset that presents generated images that depend on the orientation of the headset and the location of the players within the game arena. Players interact with the virtual world by means of a hand-held controller which they point and on which they signal actions typically by pressing keys, buttons or a trigger.

A VR gaming system decides what images and sensory experiences to present to each player. The gaming system needs to know the location and orientation of each player and each player's controller. The VR gaming system reacts to controller actions by modifying the presented sensory experiences. The VR gaming system may also provide generated video images to an external observer on a display device. The generated video images include depictions of the players and controllers in appropriate locations and orientations. Such VR gaming systems require accurate location and orientation information. Determining the controller location and direction is especially important.

SUMMARY

One approach for determining controller location and orientation is to embed an inertial measurement unit (IMU) inside the controller. Inertial measurement units typically include gyroscopes and accelerometers; and sometimes magnetomers. These devices can provide location and orientation information but have insufficient accuracy for the type of VR gaming system described above.

Accordingly, in VR gaming systems, there is a need for an accurate, inexpensive, reliable method of determining and keeping track of controller locations and orientations. Therefore, the inventors have developed a system, and method for determining the orientation of a controller by fusing information obtained from an inertial measurement unit (IMU) and tracking cameras.

According to an aspect of an exemplary embodiment, a system for determining and sending controller orientation and position in virtual game includes at least two cameras configured to view the at least one game space, at least one controller comprising an inertial measurement unit configured to be used by at least one user in the at least one game space, at least two tracking markers attached to each of the at least one controller, at least one server configured to track movements of the at least one controller during a virtual reality game, a memory containing machine readable medium comprising machine executable code having stored thereon instructions for tracking the movements of the at least one object, a control system comprising at least one processor coupled to the memory, the control system configured to execute the machine executable code to cause the control system to receive location information of a first tracking marker and a second tracking marker from among the at least two tracking markers using the at least two cameras, determine marker locations based on the received location information, receive orientation information from the inertial measurement unit comprised in the at least one controller, and determine the controller orientation and position based on the determined marker information and the received orientation information.

According to another exemplary embodiment, the functions of the control system described above and below may be performed by the at least one server.

According to another exemplary embodiment, the control system is further configured to execute the machine executable code to cause the control system to send, using the at least one server, the determined controller orientation and position to a display device being used by the at least one user.

According to another exemplary embodiment, for each of the at least two cameras, the determining the marker information includes searching the first tracking marker in a camera image taken by each camera, determining a first three-dimensional (3D) vector between each camera and the first tracking marker, adding the first 3D vectors to a first vector list, searching the second tracking marker in the camera image taken by each camera, determining a second three-dimensional (3D) vector between each camera and the second tracking marker, adding the second 3D vectors to the second vector list, determining, for each pair of vectors stored in each of the first and the second vector list, locations based on vector intersection and adding the determined locations to a first location list and a second location list respective list, and determining the marker locations by averaging locations in their respective location lists.

According to another exemplary embodiment, if the location information of the first tracking marker and the second tracking marker is not received, the control system is further configured to execute the machine executable code to cause the control system to determine controller orientation and position based on the received orientation information.

According to another exemplary embodiment, the orientation information includes at least one of pitch, roll and yaw.

According to another exemplary embodiment, the received location information comprises direction information.

According to another exemplary embodiment, the at least two tracking markers are programmable-color light emitting diodes (LEDs).

According to another exemplary embodiment, an initial color choice for each of the at least two tracking markers is one of White (R,G,B), Red (R), Blue (B), Green (G), Yellow (R,G), Cyan (B,G) and Magenta (R,B).

According to another exemplary embodiment, the color choice for each of the at least two tracking markers, after they have been found, further comprises half intensity secondary and tertiary colors.

According to another aspect of an exemplary embodiment, a method for determining and sending controller orientation and position in a virtual reality game comprising at least one game space, at least two cameras, at least one controller comprising an inertial measurement unit configured to be used by at least one user in the at least one game space, at least two tracking markers attached to each of the at least one controller, at least one processor, and at least one server, the method includes receiving, using at least one of said at least one processor, location information of a first tracking marker and a second tracking marker from among the at least two tracking markers using the at least two cameras, determining, using at least one of said at least one processor, marker locations based on the received location information, receiving, using at least one of said at least one processor, orientation information from the inertial measurement unit comprised in the at least one controller, and determining, using at least one of said at least one processor, the controller orientation and position based on the determined marker information and the received orientation information.

According to another exemplary embodiment, the method further comprises sending, using the at least one server, the determined controller orientation and position to a display device being used by the at least one user.

According to another exemplary embodiment, for each of the at least two cameras, the determining the marker locations further includes searching the first tracking marker in a camera image taken by each camera, determining, using at least one of said at least one processor, a first three-dimensional (3D) vector between each camera and the first tracking marker, adding, using at least one of said at least one processor, the first 3D vectors to a first vector list, searching the second tracking marker in the camera image taken by each camera, determining, using at least one of said at least one processor, a second three-dimensional (3D) vector between each camera and the second tracking marker, adding, using at least one of said at least one processor, the second 3D vectors to a second vector list, determining, for each pair of vectors stored in each of the first and the second vector lists, using at least one of said at least one processor, locations based on vector intersection and adding the determined location to a first location list and a second location list respectively, and determining, using at least one of said at least one processor, the marker location by averaging locations in their respective location lists.

According to another exemplary embodiment, if the location information of the first tracking marker and the second tracking marker is not received, the determining the controller orientation and position further comprises determining the controller orientation and position based on the received orientation information.

According to another exemplary embodiment, the orientation information includes at least one of pitch, roll and yaw.

According to another exemplary embodiment, the received location information comprises direction information.

According to another exemplary embodiment, the at least two tracking markers are programmable-color light emitting diodes (LEDs).

According to another exemplary embodiment, an initial color choice for each of the at least two tracking markers is one of White (R,G,B), Red (R), Blue (B), Green (G), Yellow (R,G), Cyan (B,G) and Magenta (R,B).

According to another exemplary embodiment, the color choice for each of the at least two tracking markers, after they have been found, further comprises half intensity secondary and tertiary colors.

DETAILED DESCRIPTION

Embodiments will be described below in more detail with reference to the accompanying drawings. The following detailed descriptions are provided to assist the reader in gaining a comprehensive understanding of the methods, apparatuses, and/or systems described herein and equivalent modifications thereof. Accordingly, various changes, modifications, and equivalents of the methods, apparatuses, and/or systems described herein will be apparent to those of ordinary skill in the art. Moreover, descriptions of well-known functions and constructions may be omitted for increased clarity and conciseness.

The terms used in the description are intended to describe embodiments only, and shall by no means be restrictive. Unless clearly used otherwise, expressions in a singular from include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Figure 1:
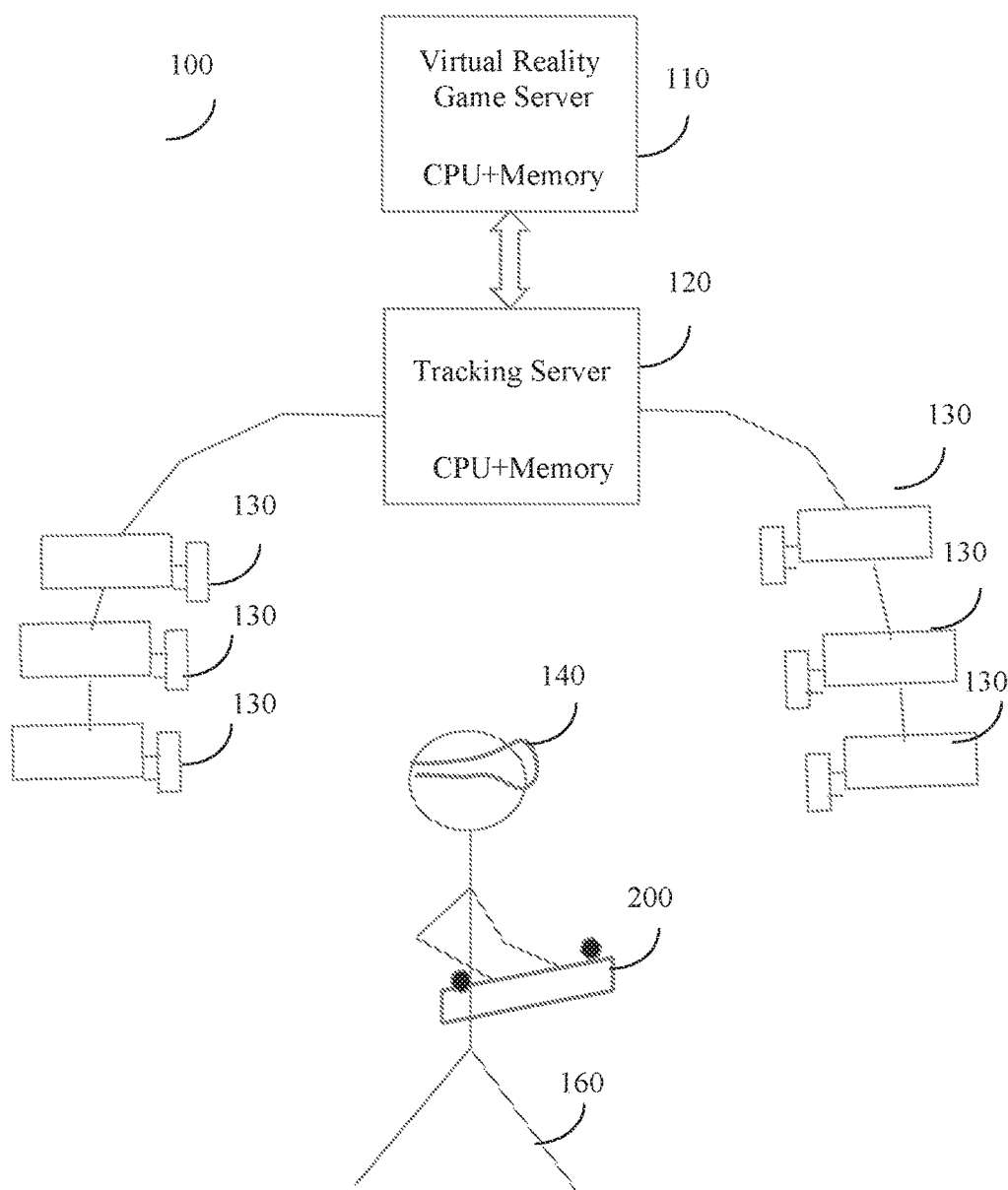
FIG. 1 depicts a VR gaming system, according to an exemplary embodiment.

FIG. 1 depicts an exemplary VR gaming system 100. The VR gaming system 100 includes a VR game server 110, a tracking server 120, multiple tracking cameras 130, and one or more players, 160, according to an exemplary embodiment. The VR game server 110 generates video images and sensory experiences which it transmits to the players' headsets 140 or another display device in possession of the player via wired or wireless communications. In the preferred embodiment, wireless communication is achieved using wireless fidelity (Wi-Fi) technology or other suitable wireless technology.

The VR game server 110 uses player 160 and VR controller 200 locations and orientations to generate the images and sensory experiences. The VR game server 110 may receive the location and orientation information regarding the player 160 and the VR controller 200 from the tracking server 120. The VR game server 110 may be realized as a software program stored in a memory and executing on one or more central processing units (CPU).

Figure 5:
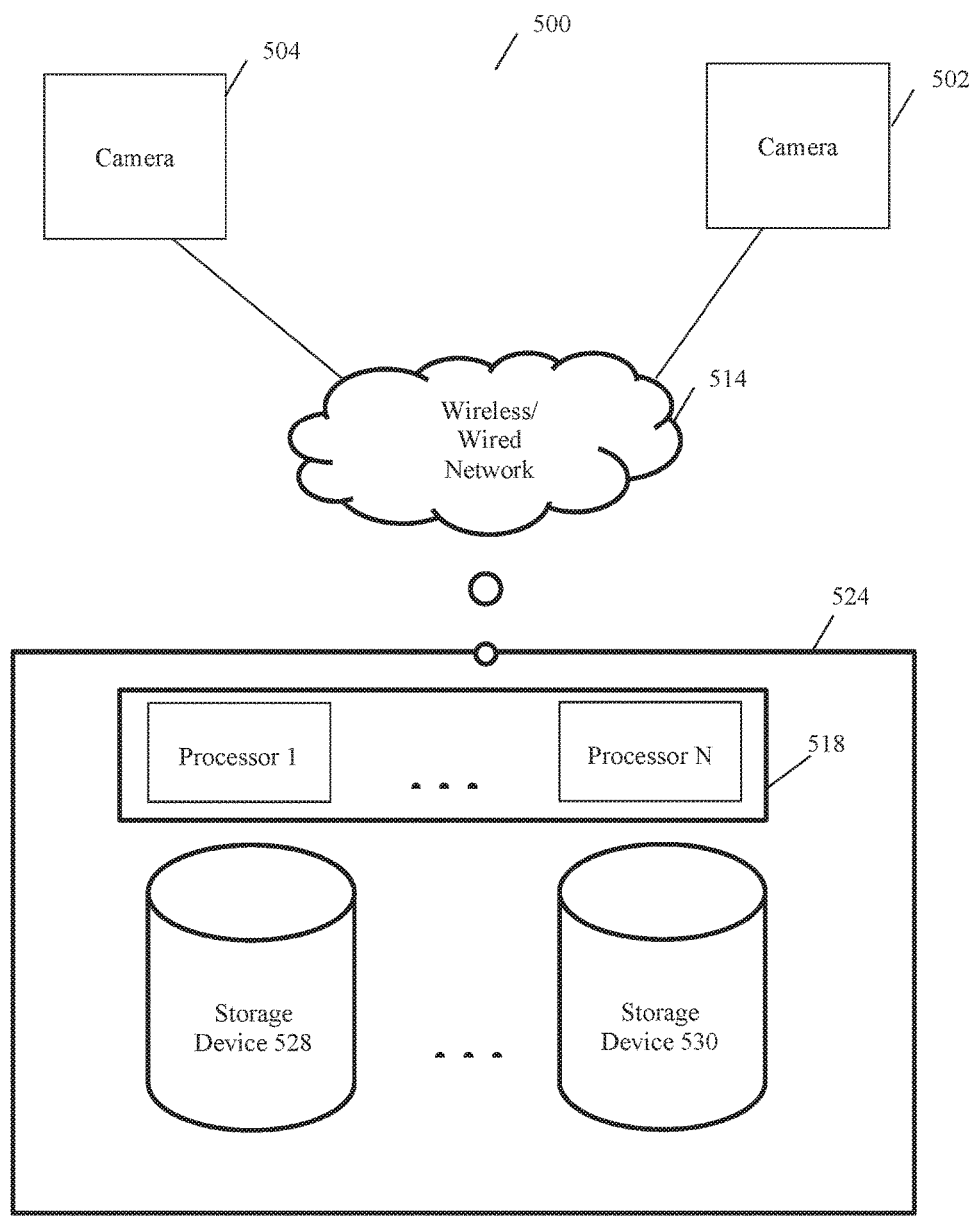
FIG. 5 depicts a block diagram of a VR gaming system, according to another exemplary embodiment.

In one embodiment the VR game server 110 communicates with the tracking server 120 by transmitting and receiving network packets over a wired connection such as Ethernet. In another embodiment the tracking the VR game server 110 communicates with the tracking server 120 by reading and writing data to a shared memory area. It should be noted that the above embodiments of communication between the VR game server 110 and the tracking server 120 are merely exemplary and the possibilities are not limited thereto. According to another embodiment, as depicted in FIG. 5, the VR game server and the tracking server may be embodied as a single server. Such an embodiment will be described in more detailed below with reference to FIG. 5

In some examples, the tracking server 120 determines the locations and orientations of players 160 and VR controllers 200. The tracking server 120 uses video images from the tracking cameras 130 and approximate orientation information provided by the VR controller 200. In some embodiments, the tracking server 120 receives video images over video cables connected to the cameras, depicted in FIG. 1. Possible video cable types include analog formats such as composite video, S-Video and VGA; and digital formats such as HDMI and DVI, however these are mere exemplary embodiments and the possibilities are not limited thereto.

In another embodiment, the tracking server 120 receives video images over a wireless communication connection. In a preferred embodiment the tracking server 120 receives orientation information from the VR controller using a wireless communication connection. The tracking server 120 may be realized as a software program stored in memory and executing on a central processing unit (CPU). In one embodiment the tracking server 120 and the game server 110 execute on different CPUs on separate computer systems. In another embodiment, the tracking server 120 and the game server 110 execute on the same computer system and share one or more CPUs of that computer system. The computer system hosting the tracking server 120 may include a video capture card that connects to the tracking cameras 130, according to an exemplary embodiment.

The tracking cameras 130 may supply video images to the tracking server 120. The number of tracking cameras 130 may depend on the size of the game arena and the number may be between 10 and 30 according to an exemplary embodiment. The tracking cameras 130 may physically be mounted from the ceiling, the walls and support structures of the game arena, however such a placement is merely an exemplary embodiment. The tracking cameras 130 are arranged to give good visual coverage of the game arena so that multiple cameras can see all possible locations.

In some examples, the tracking cameras 130 are RGB cameras, infrared cameras, or other image or radiation detectors. The locations and orientations of the tracking cameras 130 may be fixed and known for each VR game. The tracking camera 130 orientations may be determined before the VR game begins.

In a one embodiment, squares or rectangles are drawn and numbered on the floor and walls of the game arena. By seeing which rectangle or squares are visible in the camera and noting their pixel locations, the tracking server can determine the camera orientation and the direction corresponding to each pixel.

The VR headset 140 displays video images for the player 160. In some embodiments, the VR game server sends the video images to the VR headset 140 using a wireless communication connection. The VR headset is an exemplary embodiment and another display device may be used by the user to receive video images.

In some examples, the player 160 points the VR controller 200 at a game target and signals an event by pressing a trigger, a key or a button. The VR controller 200 sends approximate orientation information and event signals to the tracking server 120. In a preferred embodiment the VR controller 200 sends the approximate orientation information and event signals using a wireless communication connection. In some examples, the data packets containing the orientation information from the controller 200 may be time stamped so that they may be compared with the data detected by the tracking cameras 130. Accordingly, the data output form the tracking cameras 130 may be compared or combined with data output from the controller 200 to determine location and orientation information at specific times, including at times when the controller 200 signals an event.

Figure 2:
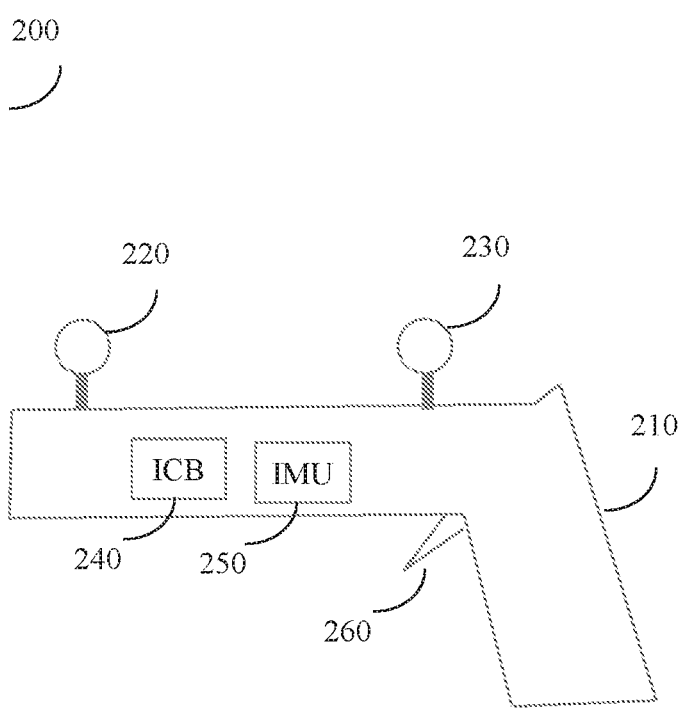
FIG. 2 depicts a VR gaming system controller, according to an exemplary embodiment.

FIG. 2 depicts an exemplary VR controller 200. The VR controller 200 has a main body 210 to which tracking markers 220 & 230 are attached and trigger 260 is attached. Although the embodiment in FIG. 2 merely shows two tracking markers 220 & 230, the VR controller 200 may incorporate more than two tracking markers as well.

In some examples, the tracking markers 220 & 230 are implemented as programmable-color light-emitting diodes (LEDs). In other examples, the tracking markers 220 & 230 may be other light or radiation sources, including fluorescent light sources, infrared bulbs, or other types of light sources.

In some examples, the systems (e.g. tracking server 120) may utilize a process for identifying the location of the tracking markers 220 & 230 and associated controller 200 by first identifying the location of the primary tracking marker 220 and then identifying the location of the secondary tracking marker 230. For instance, the tracking server 120 send a wireless commands to the VR controller 200 to illuminate the tracking markers 220 & 230 in certain sequences and colors to robustly identify and distinguish them In one example, the tracking server 120 first sends a wireless command to the primary tracking marker 220 illuminating the primary tracking marker 200 with an easily detectable color such as white. After the tracking server 120 has located the primary tracking marker 220 on the camera images, it directs the VR controller 200 to change the color of the primary tracking marker 200 and illuminate a secondary tracking marker with an easily recognizable color such as white. After the tracking server 120 has located the secondary tracking marker 230 on the camera images, it directs the secondary tracking marker 230 to illuminate a different color.

In other examples, different sequences of tracking marker 220 illumination and in different color patterns may be utilized to efficiently and robustly locate and distinguish the tracking markers 220 & 230 so the location and orientation of the controller 200 may be determined. For instance, the primary marker 220 and secondary marker 230 may be illuminated using different colors, rather than a sequence, to locate the tracking markers 220 & 230.

Locating the primary tracking marker 220 and the secondary tracking marker 230 allows the tracking server 120 to accurately determine the direction of the VR controller 200. In some embodiments, the VR controller 200 has exactly two tracking markers allowing the tracking server 120 to accurately determine the direction of the VR controller 200 but such a configuration might not allow for a complete determination of orientation about all axes.

For instance, the VR gaming system normally requires an accurate measurement of the VR controller 200 direction, for example, the vector approximating the direction of the longitudinal axis of the controller 200. In examples where the controller 200 is a gun, this would determine the direction the controller 200 is shooting. In some examples this may only be an orientation about a vertical axis or in a horizontal plane. In other examples, however, the tracking server 120 will determine a vector in the horizontal and vertical direction, to determine the vector approximating the direction of the controller's 200 longitudinal axis.

However, in some examples, the VR gaming system may not require its rotational position about the longitudinal axis of the controller 200. For instance, the orientation of twisting of the wrist or the controller 200 (e.g. gun) would not affect the direction of the virtual bullets. In other embodiments, the VR controller 200 has three or more tracking markers allowing the tracking server 120 to more fully determine the VR controller 200 orientation including its rotational orientation about the controller's 200 longitudinal axis.

In some examples, the VR controller 200 contains an internal circuit board (ICB) 240 and an inertial measurement unit (IMU) 250. The ICB 240 has the necessary electronics to monitor the trigger 260 state, control the tracking markers and communicate over a wireless connection with the tracking server 120. The inertial measurement unit (IMU) 250 is an electronic device that can measure and report a body's specific force, angular rate, and sometimes the magnetic field surrounding the body, using alone or in various combinations: (1) accelerometers and (2) gyroscopes, (3) tilt sensors, and/or (4) magnetometers.

In some examples, in the VR gaming system 100, the IMU 250 outputs the orientation of the VR controller 200 to the tracking server 120 by means of three measurements that define the degrees of pitch, roll and yaw. For instance, the IMU 250 may determine the position of the controller 200 with respect to gravity, the earth's magnetic field or with respect to an assumed or calibrated starting position, but tracking changes in position.

In some examples, the IMU 250 may assume the controller 200 is oriented in a north or certain direction about a vertical axis (parallel to gravity) when it is first turned on. In some examples, the system may ask the user to move the controller 200 to a certain orientation to calibration the system and IMU 250 output measurements. If the IMU 250 is pointing in a different direction when powered on, the tracking server 120 will need to adjust the IMU orientation measurements by a calibrated amount, for example by the orientation determined by the image data from the tracking markers 220 & 230.

When a player 160 pulls the trigger 260 to signal events such as shooting at a target, the ICB 240 can communicate such an event to the tracking server 120, according to an exemplary embodiment. In some examples, that event will be time stamped and compared with orientation information to determine an orientation of the controller 200 during the event so that an action or result can be determined.

Figure 3:
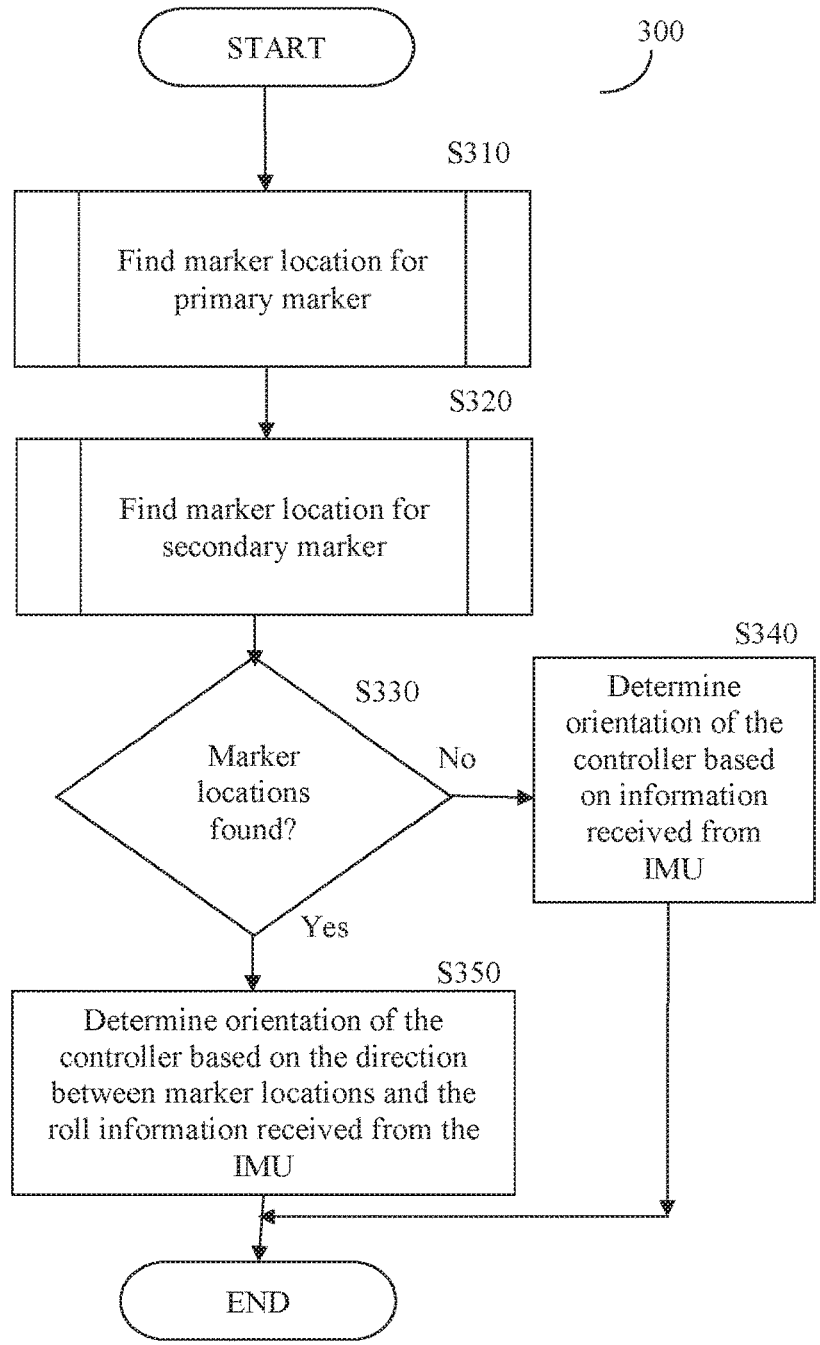
FIG. 3 depicts a flowchart for determining a VR controller location and orientation, according to an exemplary embodiment.

FIG. 3 depicts a flowchart 300 for determining a VR controller location and orientation according to an embodiment. The steps may be carried out by the tracking server 120 but can be carried out by a combination of the VR game server 110 and the tracking server 120 or other control systems. In step S310 the tracking server invokes a procedure 400 to find the location of the primary tracking marker. This procedure 400 is described in more detail below with reference to FIG. 4. In step S320 the tracking server invokes a procedure to find the location of the secondary tracking marker. In step S330 the tracking server checks whether it has found the location of both tracking markers.

If the tracking server has found the location of both tracking markers it continues at step 350, otherwise it continues at step 340. At step 340 the tracking server uses the orientation information received from the VR controller's IMU. The IMU supplies a VR controller direction and a rotation about that VR controller direction, according to an exemplary embodiment. The tracking server may adjust the IMU controller reported direction using a previously determined correction value when available. For example, if the VR controller points north-east when it is first turned on, the IMU readings, which assume the initial direction is north, will need to be adjusted by 45 degrees. When the tracking server 120 can determine the tracking marker locations, it computes the difference between the IMU reported direction and the direction computed from tracking marker locations. At step 340 the tracking server cannot determine the VR controller location using tracking cameras 130 and has to estimate the VR controller location. The tracking server 120 estimates the location using the player's location if that is known or defaults to using the last known location, according to an exemplary embodiment.

In S350 the tracking server uses the VR controller direction given by the x, y & z coordinates of the primary and secondary tracking markers. The tracking server uses the "roll" component of the IMU orientation information to determine the full orientation of the VR controller, according to an exemplary embodiment. In step 350 the tracking server 120 determines or updates the IMU correction parameter as described in the discussion above of step S340. Although step S350 described determining orientation of the VR controller based on the direction between marker locations and roll information received from the IMU, the determination may be based on information other than the roll information received from the IMU, according to another exemplary embodiment.

Figure 4:
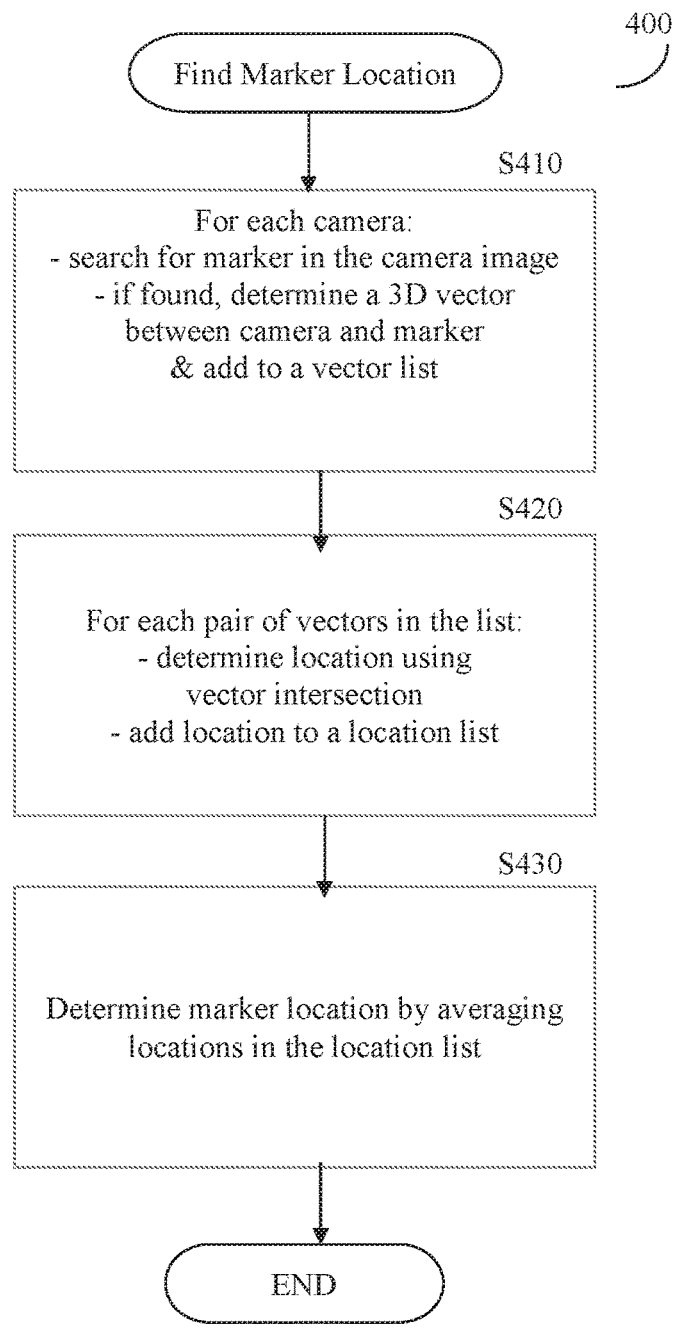
FIG. 4 depicts a flowchart for determining a VR controller location, according to an exemplary embodiment.

FIG. 4 depicts a flowchart 400 for determining a tracking marker location according to an exemplary embodiment. In step S410 the tracking server 120 searches for a specified tracking marker in the images outputs by the cameras. The first time the tracking server 120 looks for a specific tracking marker, it assumes that the location is unknown. If the location of the tracking marker is unknown, the tracking server searches every camera image from top-to-bottom, left-to-right (in some examples) looking for a set of one or more adjacent pixels of the specified color. After the tracking server has successfully found the tracking marker in a camera's image, it notes the location in that camera's image to simplify the next search. When the tracking server 120 has a known location to start from, it searches around the known location outwards in a spiral manner, according to an exemplary embodiment.

Other methods of searching may also be used. In one embodiment, the tracking server 120 simplifies the search for the secondary marker 230 by assuming it lies within a known distance of the primary tracking marker 220. If the tracking marker is found in an image, the tracking server computes a 3-dimensional vector from the camera to the tracking marker. The tracking server 120 stores the 3-dimensional vector in a vector list. The 3-dimensional vector has a starting point and a direction. The start of 3-dimensional vector is at the x, y, and z coordinates of the camera location. The direction of the 3-dimensional vector depends on the center-point pixel location of the tracking marker within the camera image, according to an exemplary embodiment. Accordingly, the pixel location translates into a direction.

In step S420, the tracking server 120 determines locations from each possible pair of vectors in the vector list. For example, with 4 vectors V1, V2, V3 and V4; the tracking server will use pairs V1+V2, V1+V3, V1+V4, V2+V3, V2+V4, and V3+V4. The tracking server determines the x, y, and z coordinates of the vector intersection using standard mathematical techniques and then stores the x, y, and z location coordinates in a location list.

In step S430, the tracking server 120 computes a tracking marker location by taking the average of the locations in the location list. In one exemplary embodiment, the tracking server 120 removes one or more distant locations from the location list before computing the tracking marker location.

The number of removed location entries may depend on the size of the location list and the distance between the individual locations and the average location.

FIG. 5 depicts a block diagram of a VR gaming system 500, according to another exemplary embodiment. The system 500 includes Cameras 502 and 504 and VR server 524. The cameras, 502 and 504, may be capable of communicating with the VR server 524 either directly or indirectly over a network 514. The cameras, 502 and 504, may communicate with the VR server 524 over the network 514 using wireless or wired connections supporting one or more point-to-point links, shared local area networks (LAN), wide area networks (WAN), or other access technologies. These cameras 502 and 504 may be transmitting video, audio or other kinds of data to the VR server 524.

According to the exemplary embodiment depicted in FIG. 5, the VR system 500 is a type of system that provides tracking of controllers using cameras 502 and 504 using storage devices 528, 530 and multiple processors 518. However, it should be appreciated that alternate embodiments of the VR system 500 may use a single processor and storage device and the depicted embodiment is merely exemplary. Furthermore, although FIG. 5 depicts a single server 524, the VR system may comprise multiple servers splitting up the functionalities which are performed by the depicted server 524, as described in the exemplary embodiment of FIG. 1.

In the exemplary embodiment depicted in FIG. 5, the VR server 524 may receive the location and orientation information regarding a user holding a controller in a game space using the cameras 502 and 504. The VR server 524 may be realized as a software program stored in a memory and executing on a central processing unit (CPU).

The VR server 524 may use video images from the tracking cameras 130 and approximate orientation information provided by the controller being used by the user (not depicted in FIG. 5, depicted in FIG. 1). In a preferred embodiment, the tracking server 120 receives video images over video cables connected to the cameras, however the images may be transferred wirelessly. Possible video cable types include analog formats such as composite video, S-Video and VGA; and digital formats such as HDMI and DVI, however these are mere exemplary embodiments and the possibilities are not limited thereto. In another embodiment, the tracking server 120 receives video images over a wireless communication connection.

The VR server may follow the procedures described in FIG. 3 and FIG. 4 to determine the position and orientation of the controller being used by a user in a game space. The VR server may further send that information to a display device (not depicted in FIG. 5, depicted in FIG. 1) being used by the user. The display device may be incorporated on the controller according to an exemplary embodiment. Another exemplary embodiment of the display device is the VR headset 140 as depicted in FIG. 1.

The embodiments disclosed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture.

Preferably, the machine is implemented on a computer platform having hardware such as one or more central processing units ("CPUs"), one or more memories, and one or more input/output interfaces. The computer platform may also include an operating system and micro-instruction code. The various processes and functions described herein may be either part of the micro-instruction code or part of the application program, or any combination thereof, which may be executed by a CPU, whether or not such computer or processor is explicitly shown. In addition, various other peripheral units may be connected to the computer platform such as an additional data storage unit and a printing unit.

Although a number of possible implementations have been mentioned, these are presented merely for the sake of explanation and teaching, and are not limitative. Moreover, an implementation of an apparatus that falls within the inventive concept does not necessarily achieve any of the possible benefits outlined above: such benefits are dependent on the specific use case and specific implementation, and the possible benefits mentioned above are simply examples.

Although the concepts have been described above with respect to the various embodiments, it is noted that there can be a variety of permutations and modifications of the described features by those who are familiar with this field, only some of which have been presented above, without departing from the technical ideas and scope of the features, which is defined by the appended claims.

Further, while this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

Although the drawings describe operations in a specific order and/or show specific arrangements of components, and are described in the context of access segments of data centers, one should not interpret that such specific order and/or arrangements are limited, or that all the operations performed and the components disclosed are needed to obtain a desired result. There are numerous hardware and software devices that can be configured to forward data units in the manner described in the present disclosure with respect to various embodiments. Accordingly, other implementations are within the scope of the following claims.

There is claimed:

1. A system for determining and sending controller orientation and position in a virtual reality session, the system comprising:
   at least two cameras;
   at least one controller comprising an inertial measurement unit configured to be used by at least one user;
   at least two tracking markers attached to each of the at least one controller;
   at least one server configured to track movements of the at least one controller during a virtual reality session;
   a memory containing non-transitory machine readable medium comprising machine executable code having stored thereon instructions for tracking the movements of the at least one controller;
   a control system comprising at least one processor coupled to the memory, the control system configured to execute the machine executable code to cause the control system to:
      receive location information of a first tracking marker and a second tracking marker from among the at least two tracking markers using the at least two cameras;
      determine marker locations based on the received location information;

receive orientation information from the inertial measurement unit comprised in the at least one controller; and determine the controller orientation and position based on the determined marker information and the received orientation information.

2. The system of claim 1, wherein the control system is further configured to execute the machine executable code to cause the control system to send, using the at least one server, the determined controller orientation and position to a display device being used by the at least one user.

3. The system of claim 1, wherein for each of the at least two cameras, the determining the marker locations comprises:

searching the first tracking marker in a camera image taken by each camera;

determining a first three-dimensional (3D) vector between each camera and the first tracking marker;

adding the first 3D vectors to a vector list;

searching the second tracking marker in the camera image taken by each camera;

determining a second three-dimensional (3D) vector between each camera and the second tracking marker;

adding the second 3D vector to a second vector list;

determining, for each pair of vectors stored in each of the first and the second vector list, locations based on vector intersection and adding the determined location to a first location list and a second location list respectively; and determining the marker locations by averaging locations in their respective location lists.

4. The system of claim 1, wherein if the location information of the first tracking marker and the second tracking marker is not received, the control system is further configured to execute the machine executable code to cause the control system to determine controller orientation and position based on the received orientation information.

5. The system of claim 1, wherein the orientation information includes at least one of pitch, roll and yaw.

6. The system of claim 1, wherein the received location information comprises direction information.

7. The system of claim 1, wherein the at least two tracking markers are programmable-color light emitting diodes (LEDs).

8. The system of claim 7, wherein an initial color choice for each of the at least two tracking markers is one of White (R,G,B), Red (R), Blue (B), Green (G), Yellow (R,G), Cyan (B,G) and Magenta (R,B).

9. The system of claim 8, wherein the color choice for each of the at least two tracking markers, after being found, further comprises half intensity secondary and tertiary colors.

10. A method for determining and sending controller orientation and position in a virtual reality session in a system that comprises; at least two cameras, at least one controller comprising an inertial measurement unit configured to be used by at least one user, at least two tracking markers attached to each of the at least one controller, at least one processor, and at least one server, the method comprising:

receiving, using at least one of said at least one processor, location information of a first tracking marker and a second tracking marker from among the at least two tracking markers using the at least two cameras;

determining, using at least one of said at least one processor, a marker location based on the received location information;

receiving, using at least one of said at least one processor, orientation information from the inertial measurement unit comprised in the at least one controller; and determining, using at least one of said at least one processor, the controller orientation and position based on the determined marker information and the received orientation information.

11. The method of claim 10, wherein the method further comprises sending, using the at least one server, the determined controller orientation and position to a display device being used by the at least one user.

12. The method of claim 10, wherein for each of the at least two cameras, the determining the marker locations further comprises:

searching the first tracking marker in a camera image taken by each camera;

determining, using at least one of said at least one processor, a first three-dimensional (3D) vector between each camera and the first tracking marker;

adding, using at least one of said at least one processor, the first 3D vectors to a vector list;

searching the second tracking marker in the camera image taken by each camera;

determining, using at least one of said at least one processor, a second three-dimensional (3D) vector between each camera and the second tracking marker;

adding the second 3D vector to a second vector list;

determining, for each pair of vectors stored in each of the first and the second vector list, using at least one of said at least one processor, location based on vector intersection and adding the determined location to a first location list and a second location list respectively; and determining, using at least one of said at least one processor, the marker locations by averaging locations in their respective location lists.

13. The method of claim 10, wherein if the location information of the first tracking marker and the second tracking marker is not received, the determining the controller orientation and position further comprises determining the controller orientation and position based on the received orientation information.

14. The method of claim 10, wherein the orientation information includes at least one of pitch, roll and yaw.

15. The method of claim 10, wherein the received location information comprises direction information.

16. The method of claim 10, wherein the at least two tracking markers are programmable-color light emitting diodes (LEDs).

17. The method of claim 16, wherein an initial color choice for each of the at least two tracking markers is one of White (R,G,B), Red (R), Blue (B), Green (G), Yellow (R,G), Cyan (B,G) and Magenta (R,B).

18. The method of claim 17, wherein the color choice for each of the at least two tracking markers further, after being found, comprises half intensity secondary and tertiary colors.

* * * * *